United States Patent [19]

Schlegel et al.

[11] 4,249,057

[45] Feb. 3, 1981

[54] CONTROL-KEY SWITCH

[75] Inventors: Eberhard Schlegel; Manfred Krügel, both of Durmentingen, Fed. Rep. of Germany

[73] Assignee: Firma Georg Schlegel, Durmentingen, Fed. Rep. of Germany

[21] Appl. No.: 83,580

[22] Filed: Oct. 11, 1979

[30] Foreign Application Priority Data

Oct. 13, 1978 [DE] Fed. Rep. of Germany ....... 2844578

[51] Int. Cl.³ .......................... H01H 9/00; H02B 1/08
[52] U.S. Cl. .................................. 200/296; 200/5 E
[58] Field of Search ............ 200/296, 295, 307, 5 E

[56] References Cited

U.S. PATENT DOCUMENTS

| 2,272,688 | 2/1942 | Catron | 200/296 |
| 2,969,443 | 1/1961 | Barden et al. | 200/296 |
| 3,091,679 | 5/1963 | Norden | 200/295 |
| 3,626,133 | 12/1971 | Teruzzi | 200/295 |

OTHER PUBLICATIONS

"Switch Mounting Latch"–IBM Technical Disclosure Bulletin, by: Meier et al., vol. 12, No. 7, 12/69.

*Primary Examiner*—Willis Little

[57] ABSTRACT

The invention relates to a control-key switch for installation in a control panel or the like, consisting of two parts, that is to say an actuator which is intended to be pushed in the direction of an axis of installation, which is at right angles to a support wall, through this support wall and to be attached to it, and of a counterpart, more particularly a switching device, which can be plugged together with the actuator in the direction of the axis of installation at the inside of the support wall and which is latchable against being pulled back.

5 Claims, 8 Drawing Figures

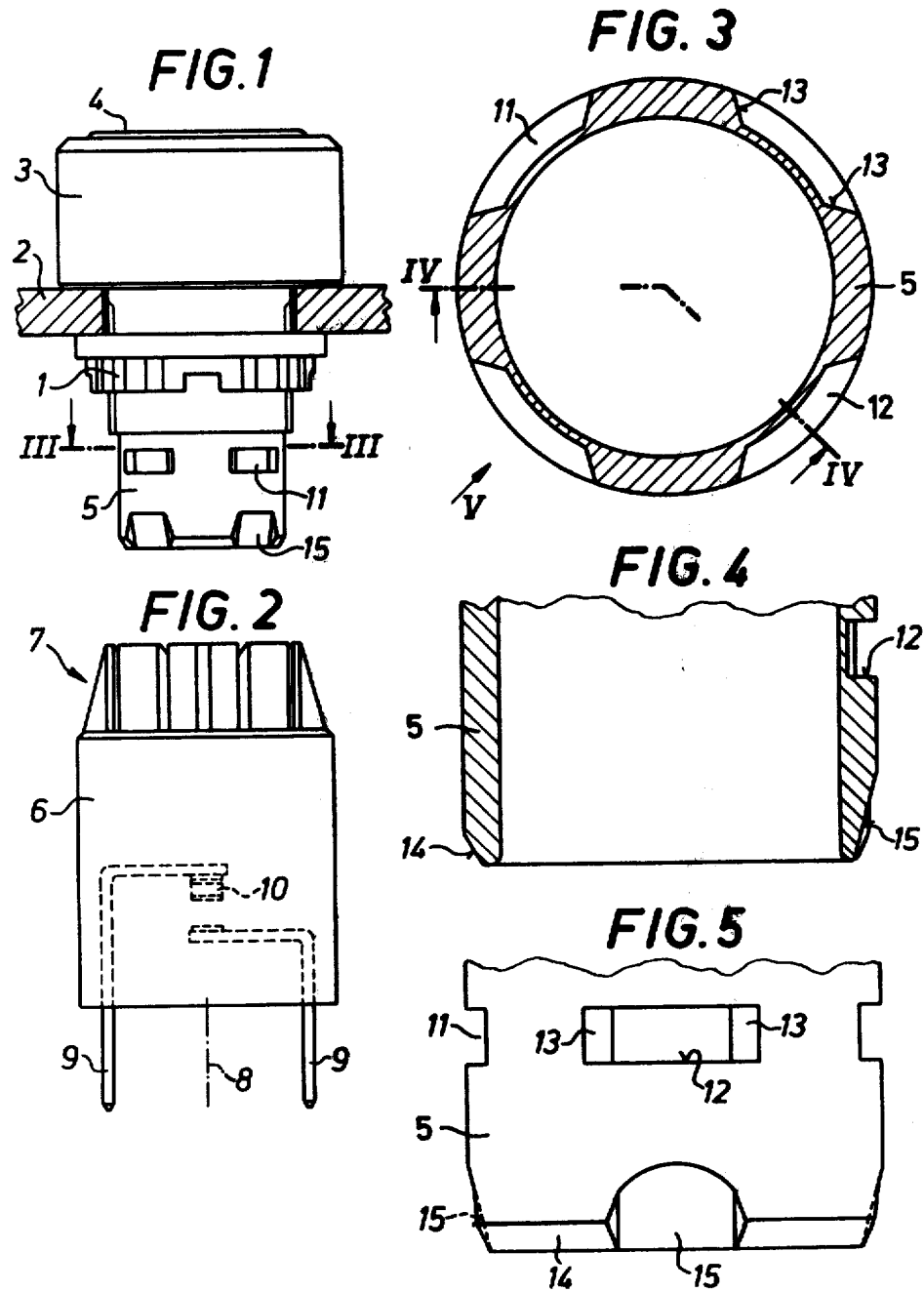

CONTROL-KEY SWITCH

BACKGROUND OF THE INVENTION

By actuator is meant a housing containing a plunger guided in it deplaceably against the force of the spring and ending on the outside in a part usually designated a pushbutton. The actuator can be attached to the support wall by, for example, clamping the support wall between a projection of the actuator housing and a screw ring. In most cases the associated switching devices possess several sets of fixed contact carriers and contact bridges, working in conjunction with the latter, which are equipped with their own restoring spring elements and are actuated by means of the plunger. Finally, connecting devices such as, for example, connector pins, for the electric lines are provided at the switching device.

The constantly necessary structural separation of a control-key switch into an actuator on the one hand, and a switching device on the other hand, raises the problem of connecting these two parts in an appropriate manner. The requirement exists for a safeguard against twisting which also resists shaking stresses which can occur, and for an adequate safeguard against pulling back since the latter must accommodate the actuating forces of the plunger and the considerably greater forces arising when axial plugs are pulled off.

Securing devices are known in the form of tiltable or displaceable latches which are actuated by means of a screwdriver and which are arranged in the region of the neck, plugged onto the actuator, of the switching device. These securing latches necessitate a considerable production effort and they proved to be unwieldy in operating since the insertion opening for the screwdriver, relative to the connecting side of the switching devices, is relatively deep and, with densely packed switching devices, cannot be inspected, but is in any case badly illuminated and additionally shaded by the connecting lines.

In addition, for connecting the parts of a control-key switch, plug arrangements are known in the manner of a bayonet lock, which are latched in the closed state. These have the disadvantage that for connecting and releasing the lock, due to the rotating catch, a relatively great angle of rotation is required which is not available with switching devices which are arranged closely together. In addition, it is considered as an impediment during installation that the switching devices must first be inserted in a difficult to find oblique position and must then be rotated into the final position.

SUMMARY OF THE INVENTION

It is the object of the invention to purpose a control-key switch for installations with particularly small mutual spacing, the parts of which can be plugged together without rotation in the final angular position and during this process automatically latch together.

Starting with a control-key switch of the type described in greater detail in the introduction, this object is achieved in accordance with the invention in that, at the one part, locking organs are provided which are elastically resilient in the radial direction and possess hook surfaces extending essentially vertically with respect to the axis of installation, and that at the other part support surfaces extending essentially vertically with respect to the axis of installation are provided, behind which the locking organs fall into place during the plugging-together of the parts in such a manner that the hook surfaces rest against the support surfaces when the parts are pulled apart, and that at the other part, for each locking organ at least one inclined surface is provided which extends essentially parallel to the axis of installation and that the inclined surfaces, during a relative rotation of the two parts around the axis of installation, deflect the locking organs to such an extent that the hook surfaces and the support surfaces become separated and the parts can be pulled apart.

Thus the locking organs are deflected elastically during the plugging-together. If the angular position of the switching device is only roughly correct the locking organs find their way automatically into the recesses via the inclined surfaces so that, on the one hand, a secure latching against pulling-back is achieved but, on the other hand, also a sufficiently secure fixing against an arbitrary rotating movement.

In contrast, the two parts are unlatched by means of rotating the switching device with respect to the actuator attached to the support wall, a small angle of, for example, 15° being already sufficient. In the twisted and unlatched position the switching device can be pulled off in a simple manner.

Clearance for such a small rotary movement is given even if the switching devices are packed very densely. Essentially, the switching devices can have any cross-section which can be, for example, round. It is suggested, especially with switching devices with rectangular cross-section (which can also be square), that the greatest length of an edge is smaller than the smallest possible mutual installation spacing of the actuators by such an amount that the switching device can always be rotated to the extent required for unlocking the locking organs.

The invention is particularly suitable for control-key switches according to a new European standard, according to which a diameter of 16 mm is prescribed for the insertion opening into the support wall, and an installation spacing of 25 mm in both directions parallel to the support wall. The switching devices of such control-key switches are spaced so closely that it would be impossible to reach through with the screwdriver in order to operate a securing latch. Naturally, these small switching devices are particularly suitable for a pure plug-in connection because of their low weight. There is also no danger that they will twist as a result of vibrations and will thus release the lock, for example.

Since, depending on application and wiring plan, it is desirable to be able to insert the different switch devices in different angular positions, it is proposed in further development of the invention that the individual support surfaces and possibly the individual locking organs are arranged to be mutually offset by 90° each with respect to the axis of installation. This provides the possibility of turning the switching devices right around in the plugged-in condition, during which they latch every 90°, or to pull them out and to reinsert them in a position rotated through any number of right angles.

As a suitable embodiment it is proposed that at the one part a tubular shell with a bevelled edge is provided and that at the other part a crown of axially projecting tongues is provided, some of which are constructed to be rigid, particularly by arranging support ribs, and rest in a guiding manner against the tubular shell, other tongues being provided with hook projections and being constructed to be elastically resilient, and that for the purpose of accommodating the hook projections, recesses are moulded into the tubular shell, which recesses possess as inner surfaces a support surface and two homologously opposite inclined surfaces.

In this arrangement it is basically possible to attach the tubular shell at the actuator or at the switching device and the tongues at the switching device or at the tubular shell, respectively. Furthermore, the arrangement can be made in such a way that the tongues are to be pushed over the tubular shell on the outside or that they are to be pushed into the tubular shell, the recesses being provided at the outside or at the inside of the tubular shell and the hook projections of the relevant tongues projecting radially inward or outward, depending on the case.

Accordingly, the preferably conical edge bevelings of the tubular shell, which have the task of simplifying the plugging-together of the two parts, must also be located on the outside or on the inside. The flatter, that is to say the longer in the axial direction, the inclination, the better this object is achieved. On the other hand, the parts plugged into one another must also have an adequate flexural stability. This is reduced by long inclined surfaces since the cylindrical guide surfaces are correspondingly shorter. As a suitable compromise it is suggested, therefore, that the edge bevelling of the tubular shell in the sections of the periphery corresponding to the position of the recesses at the periphery is flatter than in the remaining sections of the periphery. Thus the stiff tongues rest against the tubular shell over a greater length.

BRIEF DESCRIPTION OF THE DRAWINGS

In the text which follows an illustrative embodiment of the invention is explained in greater detail with the aid of the drawing, in which, individually:

FIG. 1 shows a side view of an actuator on a scale of 2:1,

FIG. 2 shows the corresponding side view of the associated switching device,

FIG. 3 shows a cross-section III—III of the tubular shell of the actuator on an enlarged scale, FIG. 4 shows a bent axial section IV—IV of the tubular shell of the actuator, FIG. 5 shows the view of the tubular shell in the direction of the arrow V.

DESCRIPTION OF THE PREFERRED EMBODIMENT

Figure 6:
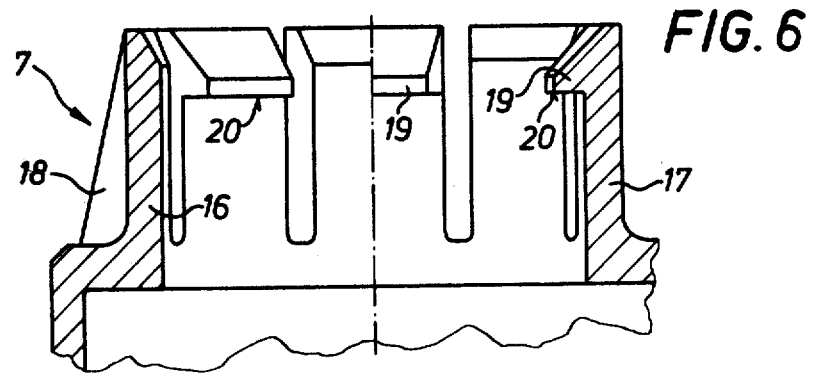
FIG. 6 shows a bent axial section VI—VI of the plug-in shroud, consisting of individual tongues, of the switching device, the internal parts being omitted for the sake of clarity.

The actuator shown in FIG. 1, which, together with the switching device shown in FIG. 2, forms a control-key switch, is attached by means of a screw ring 1 to a support wall 2, for example a control panel or the housing of a machine. At the front of the support wall 2 there is a square housing part 3 containing a just recognisable square pushbutton 4. The pushbutton is a part of a plunger, not shown, which can be moved against the force of a spring. The actuator runs out on the inside into a tubular shell 5.

The switching device according to FIG. 2 possesses a cuboid housing 6 and is pushed with its plug-in shroud 7 in the direction of the axis of installation 8, that is the central axis of the tubular shell and of the plug-in shroud, onto the tubular shell 5. Six flat connector pins 9 project at the side turned away from the support wall of the housing 6. Four of these connector pins, which extend into the housing in an angled form, form a normally-open and a normally-closed contact in conjunction with a contact bridge 10. The contact bridge 10 is moved by means of a plunger, also not shown, which is subject to the force of a spring and which works in conjunction with the plunger of the actuator. The two remaining flat connector pins are used to supply current to an indicating lamp, not shown in the drawing, which illuminates the transparent pushbutton 4 from the inside.

The FIGS. 3 to 5 show the outer shape of the tubular shell 5 in detail. The most important factors are four recesses 11 which are distributed around the periphery at an angular separation of 90° each and each of which possesses two parallel lateral surfaces which are at right angles to the axis of installation 8. One of these lateral surfaces, that is to say the lateral surface turned away from the support wall 2, is designated as the support surface 12. The two other so-called inclined surfaces 13 of the recesses run parallel to the axis and form inclined ramps leading up from the bottom of the recesses 11 to the outer jacket surface of the tubular shell 5. An outer bevel 14 at the edge of the tubular shell is broken, in the same peripheral sections as the recesses 11, by four plane run-up surfaces 15 which possess clearly less inclination, with respect to the axis of installation 8, than the bevel 14.

Figure 7:
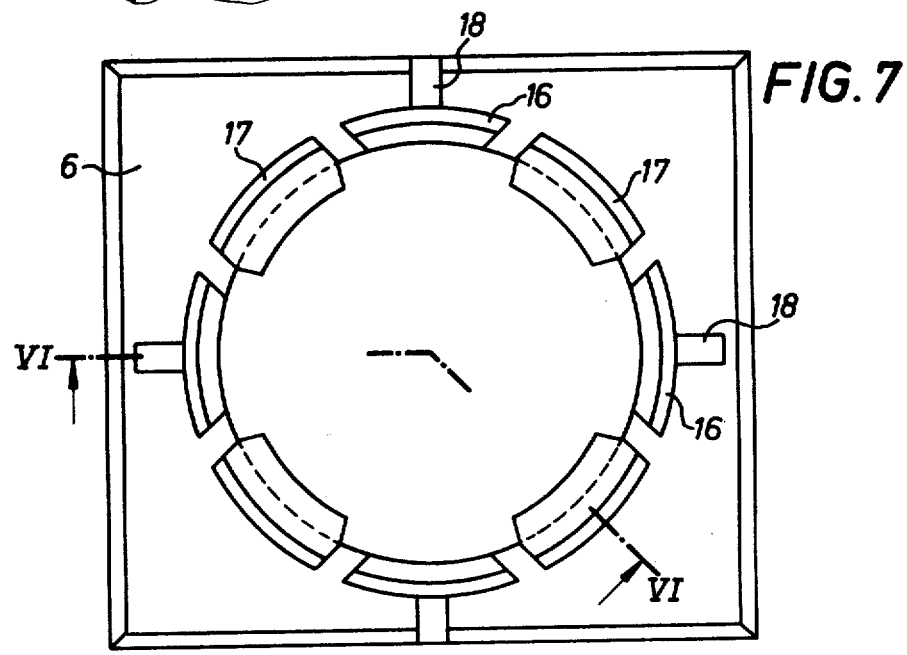
FIG. 7 shows the top view of the plug-in shroud according to FIG. 6.

The plug-in shroud 7 according to the FIGS. 6 and 7 consists of eight individual tongues 16 and 17, respectively, in the form of pieces of a cylindrical jacket the inner surfaces of which come to rest appropriately against the outer jacket of the tubular shell 5 when the switching device is pushed on. The tongues 16 are each reinforced by means of a support rib 18 and essentially effect the axial guidance, whilst the tongues 17 possess hook projections 19 which project inward and which can be bent outward elastically. Plastic materials such as, for example, polycarbonate or polyamide, used as material for the housing 6, have sufficient elasticity. The hook projections possess hook surfaces 20 which are at right angles to the axis of installation. All tongues are bevelled inward which, in conjunction with the bevel 14 and the run-up surfaces 15 of the tubular shell, simplify the plugging-on. The relatively small inclination of the run-up surfaces 15, particularly, favours the bending-out of the tongues 17. In addition, these run-up surfaces have the advantage that the hook projections 19 find their way into the recesses 11 in an even easier manner. Thus, any small inaccuracy of the angular orientation during plugging-on is automatically equalised.

The result of rotating the pushed-on and locked-in switching device to the right or to the left is that the hook projections 9 run over one of their inclined surfaces 13 and thus are bent outward until they reach the outer diameter of the tubular shell 5, so that the switching device can now be pulled off the actuator without any great resistance.

Due to the fact that the recesses 11 are mutually offset by 90°, and similarly the tongues 17, the switching device can assume altogether four different locked positions which are mutually offset by 90°.

Figure 8:
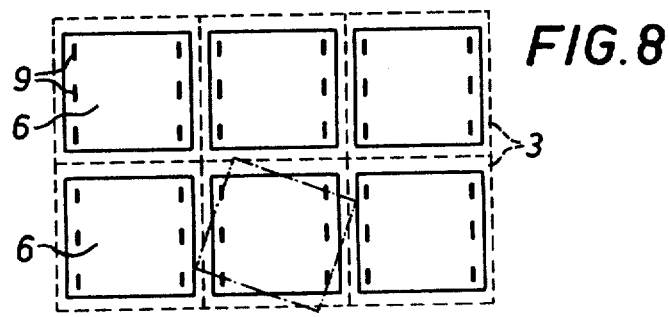
FIG. 8 shows the view of the switching devices of a group of six fully installed control-key switches in natural size.

In FIG. 8 six control-key switches are shown in their natural size, their frontal square housing parts 3 being moved together without interspaces. The longer side of the rectangular cross-section of the housing 6 of the switching devices is a little shorter than the lateral length of the housing parts 3 or the installation distance, respectively, which is identical to this lateral length. Due to this, the switching devices can be rotated through an angle which is adequate for complete unlatching, even with the dense chessboard-like installation of the control-key switches, which is indicated with dot-and-dashed lines in FIG. 8.

1—Screw ring
2—Support wall
3—Housing part
4—Pushbutton
5—Tubular shell
6—Housing
7—Plug-in shroud
8—Axis of installation
9—Flat connector pin
10—Contact bridge
11—Recess
12—Support surface
13—Inclined surface
14—Bevel
15—Run-up surface
16—Tongue
17—Tongue with hooks
18—Support rib
19—Hook projection
20—Hook surface

We claim:

1. Control-key switch for installation in a control panel or the like, consisting of two parts, that is to say an actuator which is intended to be pushed in the direction of an axis of installation, which is at right angles to a support wall, through this support wall and to be attached to it, and of a counterpart, more particularly a switching device, which can be plugged together with the actuator in the direction of the axis of installation at the inside of the support wall and which is latchable against being pulled back, characterised in that, at the one part (7), locking organs (17) are provided which are elastically resilient in the radial direction and possess hook surfaces (20) extending essentially vertically with respect to the axis of installation (8), and that at the other part (5) support surfaces (12) extending essentially vertically with respect to the axis of installation are provided, behind which the locking organs fall into place during the plugging-together of the parts in such a manner that the hook surfaces rest against the support surfaces when the parts are pulled apart, and that at the other part (5), for each locking organ at least one inclined surface (13) is provided which extends essentially parallel to the axis of installation and that the inclined surfaces, during a relative rotation of the two parts around the axis of installation, deflect the locking organs to such an extent that the hook surfaces and the support surfaces become separated and the parts can be pulled apart.

2. Control-key switch according to claim 1, characterised in that the support surfaces (12) and, if necessary, the locking organs (17) are arranged to be mutually offset by 90° each with respect to the axis of installation (8) so that the parts (5, 7), optionally offset by 90°, can be pushed together or twisted.

3. Control-key switch according to claim 1, characterised in that at the one part of tubular shell (5) with a bevelled edge (14) is provided and that at the other part a crown of axially projecting tongues (16, 17) is provided, some of which are constructed to be rigid, particularly by arranging support ribs (18), and rest in a guiding manner against the tubular shell, other tongues being provided with hook projections (19) and being constructed to be elastically resilient, and that for the purpose of accommodating the hook projections, recesses (11) are moulded into the tubular shell, which recesses possess as inner surfaces a support surface (12) and two homologously opposite inclined surfaces (13).

4. Control-key switch according to claim 3, characterised in that the edge bevelling (15) of the tubular shell (5) in the sections of the periphery corresponding to the position of the recesses (11) at the periphery is flatter than in the remaining sections of the periphery.

5. Control-key switch according to one of the preceding claims, characterised in that the switching device has a rectangular cross-section, the greatest lateral length of which is smaller than the smallest possible mutual installation spacing of the actuators by such an amount that the switching device can always be rotated to the extent required for unlocking the locking organs (17).

* * * * *